Sept. 19, 1944.  F. LICHTGARN  2,358,406
ELECTRICAL DEVICE
Filed April 20, 1942  2 Sheets-Sheet 1

INVENTOR.
Fred Lichtgarn
BY
Cox Moore & Olson
Attys.

Sept. 19, 1944.  F. LICHTGARN  2,358,406
ELECTRICAL DEVICE
Filed April 20, 1942  2 Sheets-Sheet 2

FIG. 6.

INVENTOR.
Fred Lichtgarn
BY:
Cox Moore & Olson
attys.

Patented Sept. 19, 1944

2,358,406

UNITED STATES PATENT OFFICE 2,358,406

ELECTRICAL DEVICE

Fred Lichtgarn, Wilmette, Ill.

Application April 20, 1942, Serial No. 439,629

27 Claims. (Cl. 201—63)

This invention relates to a humidity responsive device. More particularly it relates to a humidity sensitive device involving an improved humidity sensitive resistance element.

A wide variety of devices for indicating the relative humidity of the atmosphere are known in the art. However, all of them possess one or more disadvantages, in that they are inaccurate, accurate over only a limited range, do not respond rapidly to changes in atmospheric conditions, do not stay in calibration, or are not automatic recorders or indicators. For example, a wet bulb thermometer type device is highly accurate but has limited utility. On the other hand, the electric humidity measuring devices known which involve an element which varies in resistance with at least some variations in humidity, have fairly wide utility but far less accuracy and a much narrower range of conditions to which they respond.

It is, therefore, an object of this invention to provide an improved device for measuring relative humidity.

A more specific object is to provide an improved device involving electrical means for measuring relative humidity and an improved humidity responsive resistance element for use in such a device.

Another object is to provide an electrical means responsive to changes in the relative humidity which electrical means is highly accurate over a wide range of temperatures and conditions of humidity.

Still another object is to provide electrical means responsive to changes in the relative humidity which electrical means responds rapidly to changes in atmospheric conditions.

Still another object is to provide electrical means responsive to changes in the relative humidity which electrical means is both highly accurate over a wide range of temperatures and conditions of humidity and rapidly responsive to changes in atmospheric conditions.

A further object is to provide a humidity responsive resistance element which responds rapidly to changes in atmospheric conditions.

A still further object is to provide a humidity responsive resistance element the electrical resistance of which is substantially fixed for each of a wide range of relative humidities whereby it can be accurately calibrated.

Still another object is to provide a humidity responsive resistance element which responds rapidly to changes in atmospheric conditions and the electrical resistance of which is substantially fixed for each of a wide range of relative humidities whereby it can be accurately calibrated.

A still further object is to provide electrical means responsive to changes in the relative humidity which means is highly accurate over a wide range of temperatures and conditions of humidity, which means responds rapidly to changes in atmospheric conditions and which means may be employed in devices for recording or indicating relative humidity automatically or it may be employed to control other devices in accordance with the relative humidity.

Still another object is to provide an automatic control for a de-icer, particularly adapted for use in airplanes and including a humidity responsive resistance element which responds rapidly to changes in atmospheric conditions and which has an electrical resistance which is substantially fixed for given relative humidities, particularly at or near 100% relative humidity.

Another object is to provide an automatic de-icer for airplanes including de-icing means and an electrical control therefor, including a humidity responsive resistance element which responds rapidly to changes in atmospheric conditions and which has an electrical resistance which is substantially fixed for given relative humidities particularly at or near 100% relative humidity.

Other objects will appear hereinafter.

It has now been found that these objects are accomplished by an electrical resistance element of relatively low conductivity and which is highly porous and capable of adsorbing water vapor from the atmosphere in direct relation to the relative humidity. Such materials have been found to have a resistivity or conductivity which varies substantially or measurably with changes in the quantity of water adsorbed on the element but is definite and fixed for any particular quantity of adsorbed water. It is thus possible to calibrate a given element and obtain accurate readings or indications therewith over long periods of time and over variations of relative humidity from approximately 0 to 100 and over a wide range of temperatures.

Outstanding among the materials possessing the necessary properties are highly porous fired clays, preferably high grade pottery clays which are fired in the conventional manner of firing pottery clays. A good grade of unglazed, red, pottery clay has been found to give very good results but for special applications or greater sensitivity it may be preferable to employ a mixture including as the principal constituent kaolin, feldspar, china clay, or the like, particularly mixtures which also include finely divided material of relatively high conductivity and to fire the element in an oxygen-free atmosphere.

In describing the electrical resistance element above it is stated that a suitable element is capable of adsorbing water vapor from the atmosphere in direct relation to the relative humidity. By this is meant that the quantity of water adsorbed on the element increases as the relative humidity increases and also decreases as the relative humidity decreases. Usually, but not necessarily, these increases and decreases are in direct proportion to the changes in the relative humidity. By way of emphasizing the fact that the amount of adsorbed water increases with increasing relative humidity and decreases with decreasing relative humidity it is pointed out that if the temperature of the air to which the element is exposed is increased and the quantity of water vapor per unit volume of air remains the same the quantity of water adsorbed on the resistance element decreases. Conversely, if the temperature decreases and the amount of water vapor per unit volume of air remains the same the quantity of adsorbed water increases. Also at constant temperature the adsorbed water increases when the quantity of water vapor per unit volume of air increases and decreases when the quantity of water vapor per unit volume of air decreases. From the foregoing it will be apparent that when the temperature and quantity of water vapor per unit volume of air both remain the same then the amount of adsorbed water will remain constant. Finally, although such variation will not normally be encountered it has been found that if the temperature and the water vapor both either increase or decrease in such manner that the relative humidity remains constant then the quantity of adsorbed water upon the resistance element remains constant, that is, the conductivity or resistance of the resistance element remains constant.

It is desirable that the resistance element have a relatively low conductivity or a relatively high resistance so that the change in conductivity produced by the adsorbed water shall be substantial with respect to the actual conductivity. The general order of the conductivity of the preferred resistance elements is indicated by the fact that the current carried by the resistance element is ordinarily amplified by an electronic amplifier before any effort is made to measure or record its value.

It is within the scope of the invention however to employ resistance elements having a resistance sufficiently low so that they may carry currents which are measurable without electronic amplification which currents do not, however, generate or produce any material quantity of heat.

It is also important that the resistance element be highly porous for much the same reasons that it is desirable that it have a relatively low conductivity. By highly porous is meant having a great number of relatively small pores extending throughout the whole mass and accessible to the air, whereby the adsorptive area of the element per unit volume thereof is enormous. With such a large adsorptive area, although the thickness of the layer of adsorbed water may be extremely small, the total quantity adsorbed in a relatively small mass will be substantial and as the quantity of adsorbed water varies a substantial change in the conductivity results by reason of the fact that the change in conductivity takes place throughout the mass and not merely on the external surface. The nature of a suitable porosity is indicated by that of a portion of fired, unglazed, red, pottery clay. This clay, prior to the firing, is made up of a more or less adherent mass of particles of colloidal dimensions which are caused to adhere to each other and become loosely bonded together during the firing but which do not fuse completely with each other when the firing is properly conducted. The result is a rigid, yet highly porous mass containing innumerable small pores extending throughout the mass into which air may penetrate so that water vapor in the air is adsorbed not only on the external surface of the mass but also upon the surface of substantially all of these pores thereby affecting the conductivity of the element throughout its whole mass.

In order that the invention may be better understood reference is made to the accompanying drawings which form a part of this specification and in which.

Figure 1:
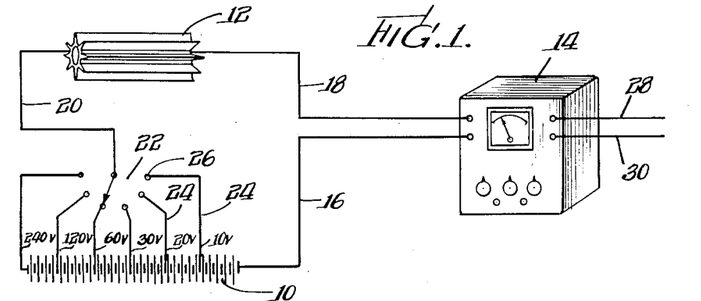
Figure 1 is a view in perspective of an electrical device embodying features of the present invention.

Referring now more particularly to Figure 1, it will be seen that the electrical device there illustrated includes a source of direct current 10, a humidity responsive resistance element 12, and an electronic amplifier volt meter 14. A line 16 connects the positive side of the source of direct current 10 to one terminal of the amplifier volt meter 14 and a line 18 connects the other terminal of the amplifier volt meter 14 to one end of the resistance element 12. The other end of the resistance element 12 is connected by a line 20 to a selector switch 22 which is in turn connected by a series of lines 24 in such a manner that each of the posts 26 of the selector switch provides a different potential. These various potentials may be, for example, as indicated, 10 volts, 20 volts, 30 volts, 60 volts, 120 volts and 240 volts. Obviously, of course, either or both of this selector switch 22 and the resistance element 12 can be connected to either the positive or negative side of the source of direct current 10. Other possible variations in the circuit will be readily apparent to those skilled in the art, it being necessary only that the resistance element 12 be positioned in the circuit so that the variations in its resistance are reflected in the electronic amplifier volt meter 14. The lines 28 and 30 provided on the electronic amplifier volt meter 14 may be connected to other apparatus, such as other meters, or recording apparatus, or may be connected to means for controlling the operation of a device not shown in accordance with the variations of the current carried through the electronic amplifier 14 by the lines 16 and 18.

More generally, the electrical arrangement indicated in Figure 1 may be varied in any desired manner within the scope of the present invention provided the arrangement includes an electrical resistance element such as the element 12 which is formed from a material as described above which has a relatively low conductivity, is highly porous, is capable of adsorbing water from the atmosphere in direct relation to the relative humidity and has a resistivity or conductivity which varies substantially or measurable with changes in the quantity of water adsorbed on the element but is definite and fixed for any particular quantity of adsorbed water. The actual physical form and size of the element 12 may be varied as desired. In general the over-all shape of the element is determined by the rapidity of response desired and the length and average cross-sectional area are selected so as to provide a total resistivity of such order as to permit ready detection of variations, bearing in mind that it is generally desirable to have the volume of the element substantial in order to minimize the effect of minor variations in the composition.

Figure 2:
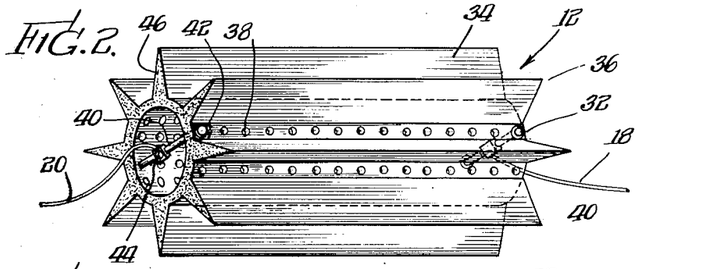
Figure 2 is an enlarged detailed view in perspective of the resistance element employed in the electrical device shown in Figure 1.

Several forms of resistance elements are illustrated in Figures 2, 3, 4 and 5, that in Figure 2 being the element 12 shown in the arrangement of Figure 1. This element 12 includes a hollow cylindrical body 32 from the outer surface of which a plurality of radial fins 34 extend. These fins 34 taper toward their outer edges 36. In the spaces on the surface of the cylinder 32 between adjacent fins 34 openings 38 are provided which extend to the interior of the body 32 and in addition to providing greater external surface area with respect to the volume as do the tapered fins 34, these openings 38 also permit the air to have greater access to the interior of the cylinder 32. Terminals are provided at either end of the element 12 by bolts 40, preferably formed of stainless steel, which extend through a pair of opposite openings 38 adjacent each end of the element 12. These bolts 40 may be secured in place, for example, by nuts 42. Centrally of bolts 40 connectors 44 are provided to which the lines 18 and 20 respectively are secured. To increase the effective area of contact between the bolts 40 and the element 12, the ends of the element 12, that is, the ends of the fins 34 and of the cylinder 32 are covered with a suitable conducting material, thus as shown, a layer of graphite 46 is formed by painting the same thereon. This graphite extends around each bolt 40 thereby giving it electrical contact with the entire end of the element 12.

Figure 3:
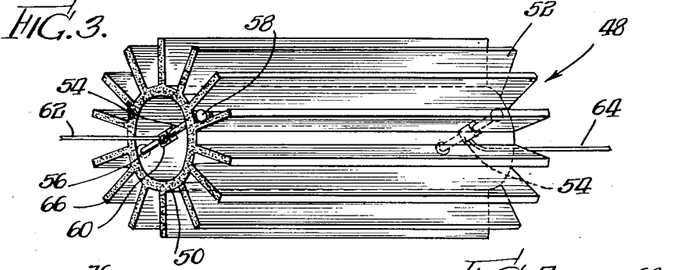
Figures 3, 4 and 5 are views similar to Figure 2 of other forms of resistance elements, and, Figure 6 is a diagrammatic illustration of a deicing control circuit.

Another form of resistor element 48 is shown in Figure 3. This element is generally similar to element 12, including a central body 50 from which radial fins 52 extend outwardly. These fins, however, are of uniform thickness and are more closely spaced than fins 34. This element is likewise provided on either end with a bolt 54 secured in opposite openings 56 by a nut 58 and provided centrally with a connector 60 to receive lines such as lines 62 and 64. Preferably also the opposite ends of element 48 are provided with a layer of graphite 66 extending into contact with the bolt 54 in order to increase the effective area of contact of the bolt 54.

Figures 4, 5:
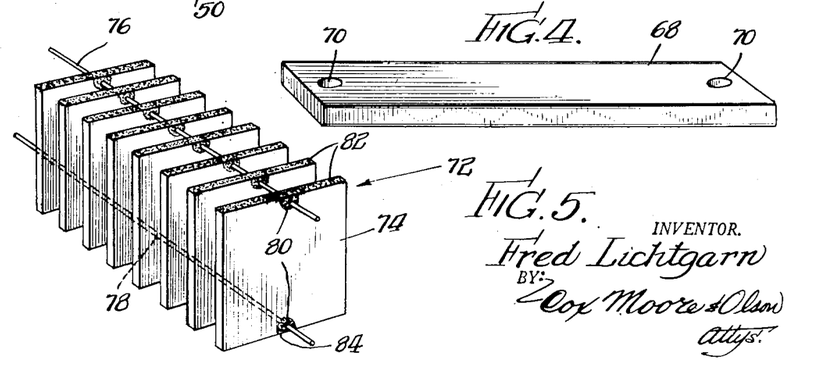

A very simple form of resistance element 68 is illustrated in Figure 4. As may be seen, this element consists of a long relatively thin slab of material as described above, such as fired clay. Openings 70 are provided on either end to receive means for connecting the slab in an electrical circuit.

Figure 5 illustrates a form of resistance element 72 providing a very large external surface relative to the volume of the parts of the element. This element is made up of a plurality of wafers 74 formed of a suitable material such as fired clay, as indicated above. The wafers 74, as shown, are square in shape but they may be rectangular or circular or have any other desired shape provided at least one dimension is relatively small. The various wafers making up the element are connected in parallel by a pair of lines or connectors 76 and 78 each of which extends through all the wafers 74 adjacent opposite edges of each, openings 80 being provided to receive these conductors. In order to increase the effective area of contact between the conductors 76 and 78 and the wafers 74 the wafers 74 are provided with layers of graphite 82 and 84 on the opposite edges adjacent which the conductors 76 and 78 are positioned and this graphite layer is extended into contact with the conductors 76 and 78.

By way of indicating suitable dimensions for the wafers 74 it is pointed out that a satisfactory element is obtained when the wafers are made about three inches square, or have a rectangular form measuring about three inches by six inches, for example. In either case the wafers are preferably about one-sixteenth of an inch thick. From about two to six wafers of the foregoing dimensions may be put together to form a very satisfactory humidity sensitive resistance element. This form of element is particularly satisfactory where abrupt temperature changes are encountered, since its construction permits it to come to equilibrium with the temperature very quickly under changing conditions.

Figure 6:
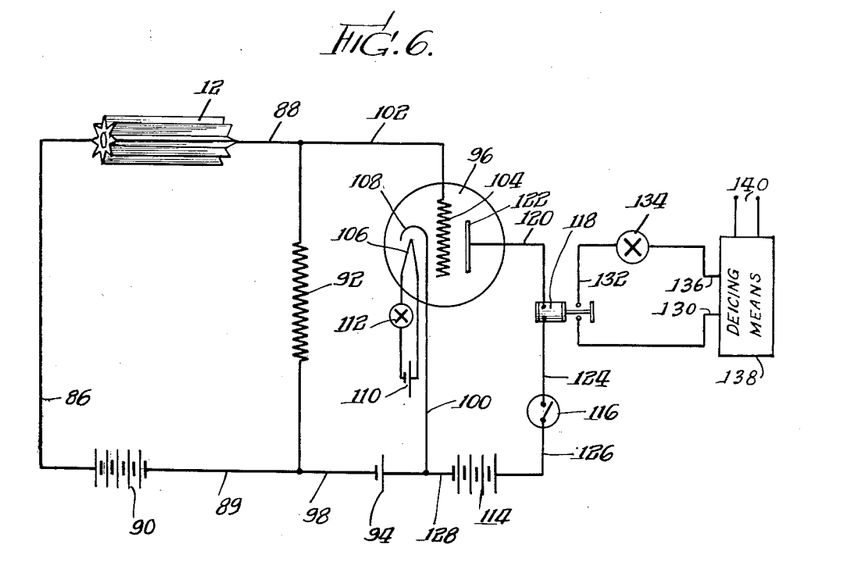

Figure 6 illustrates diagrammatically a control circuit including a humidity sensitive resistance element as disclosed herein. This circuit is particularly adapted for the control of de-icing equipment in airplanes. A resistance element 12, as illustrated in Figure 2, is employed in this circuit. It is series connected by conductors 86, 88 and 89 with a source of voltage 90. A source of C-bias 94 and the grid cathode path of a thermionic tube 96 are connected in shunt with the resistor 92 by conductors 98, 100 and 102 in such a way that the source 90 produces a positive bias on the grid 104 of tube 96. The heater 106 for the cathode 108 of tube 96 is supplied with current from source 110, an indicator light 112 being connected in series with the heater 106 and the source 110 to indicate that the heater circuit is closed.

The anode cathode path of tube 96 is connected in series with a source of current 114, thermostatic switch means 116 and a normally open relay 118 by means of a conductor 120 extending from the anode or plate 122 to the relay 118, a conductor 124 extending from relay 118 to switch 116, a conductor 126 extending from switch 116 to source 114 and a conductor 128 extending from source 114 to cathode 108. A conductor 130 is connected to one contact of the relay 118 and a conductor 132 connects the other contact to an indicator light 134, the other side of which is connected to a conductor 136. Conductors 130 and 136 in turn extend to de-icing means 138, including a source of current 140. In de-icing means 138, conductors 130 and 136 are connected to a source of current and to a de-icer or means for controlling a de-icer providing a complete circuit which is closed when the relay 118 is energized. The light 134 serves to indicate when this circuit is closed or open.

The operation of the device illustrated in Figure 1 is quite simple. The selector switch 22 and the various potentials made available by this switch simply decrease the range of variations to be recorded or read or transmitted to controlled apparatus by the amplifier volt meter 14. The changes in resistance of the element 12 over a wide range of humidities are quite large and unless a number of different potentials are available the currents will likewise vary rather widely. This expedient is a conventional one, however, in electronics, and does not require further discussion.

In order to use a device such as that illustrated in Figure 1 it is necessary to first calibrate the humidity sensitive resistance element. To this end some other accurate means of determining humidity is desirable, the accuracy of the standard required depending upon the desired accuracy of the calibration. Preferably the calibration is accomplished with a sling psychrometer or other wet bulb and dry bulb thermometer device. The calibrations may be recorded in any desired manner and may, of course, extend over any desired range of humidities. The exact nature of the calibration will depend upon the use to which the humidity responsive device is to be put. Where readings are to be taken over a wide range of humidities for the purpose of determining the actual value of the humidity the calibration may be in terms of the amperage of the current produced at a given voltage. On the other hand, if the element is to be used to operate or control some other apparatus within a limited range of humidities, the calibration may be in terms of electrical devices such as, for example, resistances required to produce suitable tripping currents. In view of the above, it is thought that the others of the wide variety of ways in which the element may be calibrated will be readily apparent to those skilled in the art.

The operation of the humidity responsive control illustrated diagrammatically in Figure 6 will be largely apparent from the foregoing. The element 12 having been calibrated, the source of current 90 and a resistor 92 are selected so that in the vicinity of 100% relative humidity the voltage drop across resistor 92 is sufficient to reduce the negative bias on grid 104 to the point where a sufficient current can flow in the plate circuit to trip relay 118 and close the de-icing control circuit. As is well understood, however, de-icing means are required to operate only when two conditions prevail. These are relative humidities of the order of 100% and temperatures of the order of 31° F. to 33° F. In order to prevent the de-icing means from being operated at 100% relative humidity where the temperature is below 31° F. or above 33° F., the thermostatic switch means 116 is included in the plate circuit. This switch means 116 is designed to open the plate circuit at a temperature above 33° F., and below 31° F., so that it is closed only between 31° F. and 33° F. This may be accomplished, for example, by providing two thermostatic elements in series. one of which is open above 33° F. and closed therebelow, and the other of which which is closed above 31° F. and open therebelow. Thus the relay 118 will be energized only when the relative humidity is in the vicinity of 100% and at the same time the temperature is between 31° F. and 33° F.

The porosity of the resistance elements employed in accordance with the present invention is important. Adsorption involves accumulation of water on a surface of the adsorptive body. By forming the resistance elements of highly porous materials. a relatively enormous total available adsorptive area is provided by the element so that the actual quantity of water adsorbed is relatively large in a relatively small volume of the element, and effects the conductivity of the element throughout its mass, thereby substantially varying the conductivity of the whole mass as the relative humidity increases and decreases and results in increases and decreases in the quantity of adsorbed water.

The enormity of the area provided is only fully appreciated when it is realized that it has been calculated that a solid cube of matter one centimeter on edge when subdivided into particles of colloidal size has a surface of over 5,000 square feet. The adsorptive area in the fired clay, for example, is believed to be of this order since clay is made up of colloidally sized particles and in the firing these particles are not completely fused together but instead are merely caused to adhere. Thus, even after the firing, the clay is not a completely fused mass but instead still consists of colloidally sized particles cemented to each other over only limited portions of their surface area and the bulk of this area is left free to absorb gases which come in contact with it. It can accordingly be employed in large masses to give a relatively enormous adsorptive area far greater than that afforded by humidity responsive elements heretofore employed.

In this connection it should be noted that the temperature at which the clay is fired is important and should be of the order of that ordinarily employed in firing clay to make earthenware and pottery. If the temperature of firing is increased very much above that ordinarily employed in making earthenware and pottery the particles of the clay instead of merely adhering in the desired manner do actually fuse together, forming a glass-like mass which lacks the desired porosity. For this reason the conditions under which the clay is fired are preferably controlled rather carefully. While clay fired under the conditions under which earthenware and pottery are ordinarily made is satisfactory, it is within the scope of the invention to fire the clay under other conditions of temperature and for other periods of time, particularly under carefully controlled temperature conditions, giving a fired product full of innumerable small pores, substantially all of which are readily accessible to air surrounding the product. The firing may also be varied by controlling the amount of oxygen present, or, in general, in the presence of a gas or gases having a composition different from that of air.

Although fired clay is particularly mentioned above as a suitable material from which to form the resistance element it will be understood that, as indicated, the invention is not limited to resistance elements formed of fired clay. Furthermore, the clay composition may be varied considerably where desired, in order to obtain special effects. While a good grade of red pottery clay has been found to give excellent results, for special purposes, particularly where high sensitivity is desired, the invention contemplates the formation of resistance elements from clay, clay-like or ceramic materials which are highly porous, such as kaolin, feldspar, china clay, or in general, alumino-silicates, particularly hydrous alumino-silicates, or compositions comprising powdered metals or metal oxides or graphite, for example, alumina, hydrous oxides of aluminum, iron oxides and manganese oxides, and also comprising various binders, including resinous materials and silica, particularly mixtures comprising oxides characteristic of clay, or clay mixtures including powdered metals and metal oxides. particularly high melting point metals and metal oxides, and/or graphite or finely divided carbon, and the resistance elements may be fired in an oxygen-free atmosphere, if desired. Among the finely divided materials which may be included and which when included increase the conductivity are conductive materials such as graphite and powdered or precipitated metals of relatively high melting points and their oxides, for example, tungsten, cobalt, tantalum, platinum, gold, nickel and chromium, and their oxides. Instead of employing ordinary pottery clay, kaolin, feldspar or flint may be used, for example, and these may have combined with them the finely divided materials of relatively high conductivity. Particularly desirable materials to add are metals such as chromium, nickel, gold and platinum, which, in addition to having high melting points, are relatively non-oxidizing.

It will be apparent that the addition of electrically conductive materials to the element will increase the conductivity but that these metals should be added in moderate amounts in order to avoid giving the element a conductivity so high that the adsorbed water will not produce a substantial change therein. Resistance elements having conductivity increased by the presence of conductive materials, such as metallic powders, are particularly desirable where measurements of very low relative humidities are to be made. Although the elements containing metals added to increase the conductivity may be used for relative humidities above 20%, they are not normally necessary.

Elements containing added finely divided conducting materials are also advantageous where it is desired to measure the current without the aid of electronic amplifying means as is necessary with the very low conductivity resistance elements. By way of illustration, a resistance element which has a low enough resistance so that electronic amplifying means are unnecessary may be made as follows: A clay or other binder, such as a synthetic clay, is mixed thoroughly with a substantial portion of powdered graphite or a powdered metal, such as chromium, tungsten or tantalum in the proportion of about one-tenth metal to about nine-tenths clay, by weight, sufficient water being included to permit the mass to be shaped. After forming the mass into the desired shape, it is fired in an oxygen-free atmosphere at about 1200° F. Such an element, although still having a relatively high resistance, adsorbs water vapor from the air in amounts varying with the relative humidity and does not require the use of an electronic amplifier. It will be noted that this element is fired in an oxygen-free atmosphere. Firing of a resistance element in an oxygen-free, or better yet, in a reducing atmosphere is generally desirable where the element includes a powdered metal.

Other compositions from which resistance elements may be formed include mixtures of graphite or metals or metal oxides with fluid resinous materials which serve as binders for the graphite and metals or metal oxides. These compositions, after forming or casting, are treated to harden the resinous material or to evaporate the carrier in case the resinous material is dissolved or dispersed in a carrier which upon evaporation leaves the resinous material in the form of the desired body. In fact, where a resinous material is employed as a binder it is preferable that it be in the form of a solution or dispersion and that it be a resin which upon evaporation of the solvent or continuous phase is precipitated in the form of a solid body since the evaporation of the material in which the resin is dissolved or dispersed leaves the resin in a highly porous condition.

Other synthetic compositions from which the resistance elements of the present invention may be formed include synthetic clay-like materials obtained by mixing alkaline earth metal oxides or other metal oxides with kaolin or a like binder or by mixing with such a binder graphite or the metals or metal oxides mentioned above as conductors. Among the like binders which may be used in these compositions instead of kaolin are low melting point glass compositions. In general it will be seen that the synthetic compositions which may be employed to form resistance elements in accordance with this invention like the naturally occurring clay include a relatively high melting point oxide with a lower melting point binder therefor. It will also be understood that in making up the synthetic compositions or in selecting natural compositions it is to be borne in mind that they should be highly porous to provide a large adsorption area and should have a relatively low conductivity which increases measurably upon the adsorption of the water and which increases and decreases as the relative humidity increases and decreases.

Although it is not usually necessary, the resistance elements made as described herein can be reconditioned where they become contaminated in some manner or other. For example, the element may become coated with dust or other extraneous material. The reconditioning may be carried out in any of a number of ways without affecting the element or harming it in the slightest degree. Thus, it may be heated gradually to red heat and then cooled to room temperature or it may be boiled in water and then dried or it may be subjected to the action of superheated steam. That this treatment does not harm the element is evidenced by the fact that such reconditioning does not affect the calibration of the element in most cases.

The speed of response to changes in humidity, as well as changes in temperature, is determined at least in part by the thickness of the element or of the parts of the element. The preferred forms of resistance elements, therefore, provide a minimum of thickness throughout their extent consistent with adequate physical structure. Element 12, shown in Figures 1 and 2, is desirable from this standpoint. Those shown in Figures 3 and 5, on the other hand, provide rapid response due to their lack of any very thick portions. Elements having the very simple form shown in Figure 4 give quite satisfactory results, however.

Instead of employing the means particularly described above for connecting the elements in electrical circuits any other desired means may be employed. It is preferable, however, that the connecting means shall provide a relatively large area of contact with the element due to the low conductivity of the element. It is within the scope of the invention to provide this extended area of contact, however, by graphite alone, or by other means than a layer of graphite, as described above. Any suitable means, such as a metal plate or holder for the end of the element may be employed, but it should preferably give a relatively large area of contact extending, for example, over the entire end of the element.

Attention is also directed to the fact that the control diagrammatically illustrated in Figure 6 and described herein is merely intended to be illustrative and the invention is not intended to be limited to the particular type of circuit there shown, nor to the use of the particular elements employed in this circuit. In view of the above description, it will be readily understood how the humidity responsive resistor elements of this invention, such as the element 12, may be employed in means for controlling the operation of a variety of devices according to the relative humidity. Due to the fact that the currents which can be carried by the humidity responsive resistance elements is relatively small due to their relatively high resistance, it will generally be necessary to employ amplifying means or means sensitive to relatively small currents, such as a thermionic tube. The tube 96 shown in the diagram is a simple type of vacuum tube. It will be understood, however, that other types of vacuum tubes or gas filled tubes of the type sometimes called trigger tubes, or, in fact, any desired type of thermionic tube may be employed, the other elements of the circuit being suitably adjusted as will be readily apparent to those skilled in the art. The humidity sensitive resistance element 12 of this invention may be located any desired place in the circuit. Also the thermostatic switch means 116 may be omitted where the circuit is not required to be responsive to temperatures within a particular range, although it is preferably employed in de-icing control. Furthermore, it may be located at other places than in the plate circuit and may be of any desired type, the use of two thermostatic switches as suggested above being merely illustrative.

Many of the advantages of the invention will be apparent from the foregoing description. Outstanding among the advantages of the present invention is the property of the resistance elements that their conductivity varies as the relative humidity of the air varies over humidities ranging all the way from approximately 0 to 100% and over a very wide range of temperatures extending from −10° F. and below, up to and above 100° F. In many cases the conductivity varies directly as the relative humidity of the air varies. Accordingly, by associating these elements with appropriate electrical means and calibrating them, indications of the relative humidity can be obtained. The advantages of the elements are the more striking when their action is compared with that of humidity responsive elements previously known, such as hygroscopic chemicals, for example, which give satisfactory expressions of humidity over only narrow ranges and which do not readily give up the moisture they absorb from the air. The elements of the present invention are also characterized by a very great sensitivity or rapid response to changes in humidity, whereas elements previously used involving conductors separated by insulating means or conductors spaced apart on a glass surface, are slow to respond to changes, particularly decreases, in humidity and in general do not give satisfactory indications of humidity, except over a limited range of humidity conditions.

Another advantage of the elements of the present invention is that they are structurally strong and are remarkably constant in characteristics. Once an element has been calibrated, that calibration may be employed for long periods of time and is not affected by any conditions normally encountered. In particular, the elements can be brought into contact with liquid water without in any way affecting their calibration once the water has been evaporated. Also, the passage of the electrical currents, which takes place throughout the mass of the elements when they are in actual use, has no effect upon them so far as the calibration is concerned, at least. Also, the elements may be subjected to rather severe conditions in cases where for some reason regeneration or reconditioning is desirable. Thus, the elements can be heated to high temperature or subjected to the action of steam or boiling water without affecting their calibration when such steaming or heating is followed by drying or cooling, as the case may be.

Another very important advantage of the elements is that it is not necessary that there be any fixed circulation of air over or about the elements in order to have them respond rapidly to changes in the humidity. Even in stagnant air they will indicate the humidity very quickly. This is in contrast to many elements previously known which require the movement of large volumes of air over and above them in order to obtain a response.

The properties of the elements of the present invention, particularly the fired clay, are the more surprising when it is recognized that many substances presenting a large absorptive surface do not possess the properties of the clay. Thus, many substances which will adsorb gases in contact therewith, such as water vapor, do not appreciably increase or decrease their conductivity as the quantity of adsorbed water vapor increases or decreases. For example, many substances adsorb water very readily but do not become measurably conductive until a rather high level of humidity is reached. Other substances are in themselves such good conductors of electricity that any increases in conductivity produced by the adsorption of water is not measurable. Still another class of substances adsorb water vapor very readily, but will not release it as the humidity decreases and so are unsatisfactory. Certain substances such as hygroscopic chemicals absorb or adsorb water vapor in air but in so doing undergo a more or less permanent physical or chemical change and for this reason are unsatisfactory. Silica gel is an example of a porous material which adsorbs water vapor but will not give it up unless subjected to relatively high temperature. In contrast to the foregoing, the fired clay elements as described herein have been tested at temperatures ranging from −10° F. to about 100° F., which was all of the available range of temperatures to which they could be subjected, and it has been found that throughout this full range of temperatures and over the full range of humidity conditions these elements responded quickly and accurately and repeatedly gave the same reading for the same relative humidity. Still another advantage of the elements of this invention is that relatively large volumes of the material from which they are made can be employed in a single element and this element may be given a shape adapted to adsorb a relatively large quantity of water vapor quickly. This is true because the elements of this invention are particularly adapted for adsorption of gas throughout their mass and not merely on their external surface so that the conductivity is varied throughout the mass.

From the foregoing it will be apparent that the humidity responsive resistance elements of this invention are especially suitable for use in control circuits responsive to humidity, and particularly in circuits for controlling de-icing equipment in airplanes, due to their rapid and accurate response to changing humidity conditions and freedom from any tendency to change in calibration even when subjected to large variations in temperature or severe temperature conditions, or even to the action of liquid water. As indicated above they remain accurate in their calibration at a temperature below zero as well as those above.

Furthermore, the composition from which the element is made may be varied to give a satisfactory response with relatively large currents of electricity which can be measured without the aid of electronic means or to give a more highly selective response within a given range. Thus, the humidity responsive devices including the elements described herein have a very wide field of utility. They can be employed either as indicators or controls, and, in fact, in any desired manner. Still other advantages of the elements and humidity responsive devices included herein will be obvious to those skilled in the art from the foregoing description.

The present invention provides humidity responsive resistance elements which are specially and specifically adapted and capacitated to adsorb water vapor from the air in contact with them or throughout their mass. It has been discovered in accordance with this invention that by using highly porous materials such as fired clays a concentration of water vapor can be obtained so that it is not necessary to resort to hygroscopic chemicals. A means is provided of adsorbing water vapor in an efficient and thoroughly effective manner. A large volume of water vapor is adsorbed on a small mass of material to give a concentrated effect. The water vapor is adsorbed furthermore, in a very efficient manner that is entirely novel to the art so that a distinctly improved method of determining relative humidity is provided. The adsorption is efficient and concentrated by reason of the fact that it takes place all through the mass as well as on the external surfaces of the element so that as a result the conductivity takes place all through the mass as well as on the external surfaces thereby making the whole unit conductive. In short, the concentration referred to is obtained because the total available adsorption surface is enormous compared to the bulk of the element. In short, the elements of the present invention are adapted specifically for water vapor adsorption because of their great porosity. By way of further illustration it is pointed out that fired, unglazed, red, pottery clay is composed of colloidal particles loosely bonded together to form a rigid yet highly porous mass. The surfaces of these billions of separated particles are readily and freely available for water vapor molecules to adsorb onto so that this clay is a highly efficient adsorber. The novel method of determining relative humidity which is disclosed herein has the advantage that it is a method of concentration by the process of adsorption on a material of great porosity having also the property of becoming proportionally conductive under changing humidity conditions.

It is apparent that many widely different embodiments of this invention may be made without departing from the spirit and scope thereof and, therefore, it is not intended to be limited except as indicated in the appended claims.

I claim:

1. An electrical resistance element formed of a highly porous, non-hygroscopic composition having a high resistivity which is fixed by the relative humidity of air in contact therewith and is different for different values of the relative humidity of such air.

2. An electrical resistance element formed of a highly porous composition which adsorbs water vapor from the air in amounts differing for different values of relative humidity of the air and has a high resistivity which is fixed by the relative humidity of air in contact therewith and is different for different values of the relative humidity of such air, said composition being composed of comparatively inert and chemically stable materials in a finely divided, loosely bonded condition, the particles thereof being of microscopic and submicroscopic size and said element being characterized by the porosity of fired unglazed, red, pottery clay because said particles are to a great degree separated and only touch one another irregularly thereby offering an extremely large total surface area onto which the adsorption of water vapor can take place in a most efficient manner.

3. An electrical resistance element the resistivity of which increases and decreases with increases and decreases in the relative humidity of the air in contact therewith, said element comprising a metal oxide and silica bound together to form an integral, highly porous body adapted specifically for water vapor adsorption because it is highly porous.

4. An electrical resistance element the resistivity of which increases and decreases with increases and decreases in the relative humidity of the air in contact therewith, said element comprising an integral body of water vapor adsorptive material having a porosity corresponding to that of fired, unglazed, red, pottery clay adapted to concentrate water vapor by adsorption and to adsorb and desorb water vapor respectively as the relative humidity increases and decreases whereby the conductivity correspondingly increases and decreases.

5. An electrical resistance element the resistivity of which increases and decreases with increases and decreases in the relative humidity of the air in contact therewith, said element comprising a metal oxide and silica bound together to form an integral body of water vapor adsorptive material having a porosity corresponding to that of fired, unglazed, red, pottery clay.

6. An electrical resistance element the resistivity of which increases and decreases with increases and decreases in the relative humidity of the air in contact therewith, said element comprising oxides characteristic of clay bound together to form an integral body of water vapor adsorptive material having a porosity corresponding to that of fired, unglazed, red, pottery clay whereby an element is provided which is specially and specifically adapted and capacitated to adsorb water vapor all throughout the mass in an efficient and thoroughly effective manner thereby adsorbing a large volume of water vapor which is enough in a small mass to give a concentrated effect.

7. An electrical resistance element the resistivity of which increases and decreases with increases and decreases in the relative humidity of the air in contact therewith, said element comprising a metal oxide and silica bound together to form an integral, highly porous body having uniformly distributed therein and bound therewith a finely divided conductive material melting above the firing temperature of the body and selected from the group consisting of graphite, metals and metal oxides.

8. An electrical resistance element the resistivity of which increases and decreases with increases and decreases in the relative humidity of the air in contact therewith, said element comprising an integral body of water vapor adsorptive material having a porosity corresponding to that of fired, unglazed, red, pottery clay and having uniformly distributed therein and bound therewith a finely divided conductive material melting above the firing temperature of the body and selected from the group consisting of graphite, metals and metal oxides.

9. An electrical resistance element the resistivity of which increases and decreases with increases and decreases in the relative humidity of the air in contact therewith, said element comprising oxides characteristic of clay bound together to form an integral body of water vapor adsorptive material having a porosity corresponding to that of fired, unglazed, red, pottery clay and having uniformly distributed therein and bound therewith a finely divided conductive material melting above the firing temperature of the body and selected from the group consisting of graphite, metals and metal oxides.

10. An electrical resistance element the resistivity of which increases and decreases with increases and decreases in the relative humidity of the air in contact therewith, said element comprising a body of fired, unglazed, pottery clay.

11. A device comprising an electrical resistance element, which device is responsive to the relative humidity of the air in contact with said resistance element, said resistance element being formed of a highly porous, non-hydroscopic composition having a high resistivity which is fixed by the relative humidity of air in contact therewith and is different for different values of the relative humidity of such air.

12. A device comprising an electrical resistance element, which device is responsive to the relative humidity of the air in contact with said resistance element, said resistance element being formed of a highly porous composition which adsorbs water from the air in amounts differing for different values of relative humidity of the air and has a high resistivity which is fixed by the relative humidity of air in contact therewith and is different for different values of the relative humidity of such air, said composition being composed of comparatively inert and chemically stable materials in a finely divided, loosely bonded condition, the particles thereof being of microscopic or submicroscopic size and said element being characterized by the porosity of fired, unglazed, red, pottery clay because said particles are to a great degree separated and only touch one another irregularly thereby offering an extremely large total surface area onto which the adsorption of water vapor can take place in a most efficient manner.

13. A device comprising an electrical resistance element and electrical means responsive to variations in the electrical resistance of said element, said resistance element having a resistivity which increases and decreases with increases and decreases in the relative humidity of the air in contact therewith, said element comprising a metal oxide and silica bound together to form an integral, highly porous body adapted specifically for water vapor adsorption because it is highly porous.

14. A device comprising an electrical resistance element and electrical means responsive to variations in the electrical resistance of said element, said resistance element having a resistivity which increases and decreases with increases and decreases in the relative humidity of the air in contact therewith, said element comprising an integral body of water vapor adsorptive material having a porosity corresponding to that of fired, unglazed, red, pottery clay adapted to concentrate water vapor by adsorption and to adsorb and desorb water vapor respectively as the relative humidity increases and decreases whereby the conductivity correspondingly increases and decreases.

15. A device comprising an electrical resistance element and electrical means responsive to variations in the electrical resistance of said element, said resistance element having a resistivity which increases and decreases with increases and decreases in the relative humidity of the air in contact therewith, said element comprising a metal oxide and silica bound together to form an integral body of water vapor adsorptive material having a porosity corresponding to that of fired unglazed, red, pottery clay.

16. A device comprising an electrical resistance element and electrical means responsive to variations in the electrical resistance of said element, said resistance element having a resistivity which increases and decreases with increases and decreases in the relative humidity of the air in contact therewith, said element comprising oxides characteristic of clay bound together to form an integral body of water vapor adsorptive material having a porosity corresponding to that of fired unglazed, red, pottery clay whereby an element is provided which is specially and specifically adapted and capacitated to adsorb water vapor all throughout the mass in an efficient and thoroughly effective manner thereby adsorbing a large volume of water vapor which is enough in a small mass to give a concentrated effect.

17. A device comprising an electrical resistance element and electrical means responsive to variations in the electrical resistance of said element, said resistance element having a resistivity which increases and decreases with increases and decreases in the relative humidity of the air in contact therewith, said element comprising a metal oxide and silica bound together to form an integral, highly porous body having uniformly distributed therein and bound therewith a finely divided conductive material melting above the firing temperature of the body and selected from the group consisting of graphite, metals and metal oxides.

18. A device comprising an electrical resistance element and electrical means responsive to variations in the electrical resistance of said element, said resistance element having a resistivity which increases and decreases with increases and decreases in the relative humidity of the air in contact therewith, said element comprising an integral body of water vapor adsorptive material having a porosity corresponding to that of fired unglazed, red, pottery clay and having uniformly distributed therein and bound therewith a finely divided conductive material melting above the firing temperature of the body and selected from the group consisting of graphite, metals and metal oxides.

19. A device comprising an electrical resistance element and electrical means responsive to variations in the electrical resistance of said element, said resistance element having a resistivity which increases and decreases with increases and decreases in the relative humidity of the air in contact therewith, said element comprising oxides characteristic of clay bound together to form an integral body of water vapor adsorptive material having a porosity corresponding to that of fired unglazed, red, pottery clay and having uniformly distributed therein and bound therewith a finely divided conductive material melting above the firing temperature of the body and selected from the group consisting of graphite, metals and metal oxides.

20. A device comprising an electrical resistance element and electrical means responsive to variations in the electrical resistance of said element, said resistance element comprising a body of fired, unglazed, pottery clay and having a resistivity which increases and decreases with increases and decreases in the relative humidity of the air in contact therewith.

21. An electrical control for de-icing means comprising an electrical resistance element, which control is responsive to relative humidities of the air in contact therewith of the order of 100%, said resistance element being formed of a highly porous, non-hygroscopic composition, having a high resistivity which is fixed by the relative humidity of air in contact therewith, and is different for different values of the relative humidity of such air.

22. An electrical control for de-icing means comprising an electrical resistance element and thermostatic switch means, which control is responsive to relative humidities of the air in contact therewith of the order of 100% at temperatures adjacent 32° F., said resistance element being formed of a highly porous composition having a high resistivity which is fixed by the relative humidity of air in contact therewith and is different for different values of the relative humidity of such air.

23. In an aircraft, the combination of de-icing means and control means for said de-icing means, which control means is responsive to predetermined relative humidity and temperature conditions of the air surrounding said aircraft, said control means comprising an electrical resistance element formed of a highly porous, non-hygroscopic composition, having a high resistivity which is fixed by the relative humidity of air in contact therewith, and is different for different values of the relative humidity of such air.

24. An electrical control for de-icing means comprising an electrical resistance element and thermostatic switch means, which control is responsive to relative humidities of the air in contact therewith of the order of 100% at temperatures adjacent 32° F., said resistance element having a resistivity which increases and decreases with increases and decreases in the relative humidity of the air in contact therewith and said element comprising oxides characteristic of clay bound together to form an integral body of water vapor adsorptive material having a porosity corresponding to that of fired unglazed, red, pottery clay.

25. An electrical control for de-icing means comprising an electrical resistance element, which control is responsive to relative humidities of the air in contact therewith of the order of 100%, said resistance element comprising a body of fired, unglazed, pottery clay and having a resistivity which increases and decreases with increases and decreases in the relative humidity of the air in contact therewith.

26. An electrical control for de-icing means comprising an electrical resistance element and thermostatic switch means, which control is responsive to relative humidities of the air in contact therewith of the order of 100% at temperatures adjacent 32° F., said resistance element comprising a body of fired, unglazed, pottery clay and having a resistivity which increases and decreases with increases and decreases in the relative humidity of the air in contact therewith.

27. An electrical device comprising an electrical resistance element arranged in an electrical circuit, said device being responsive to changes in the relative humidity of the air in contact with said resistance element and said resistance element being formed of a highly porous, non-hygroscopic composition having a high resistivity which is fixed by the relative humidity of air in contact therewith and is different for different values of the relative humidity of such air.

FRED LICHTGARN.